E. REEVE.
CHANGE SPEED GEARING.
APPLICATION FILED APR. 24, 1919.
1,365,195.
Patented Jan. 11, 1921.
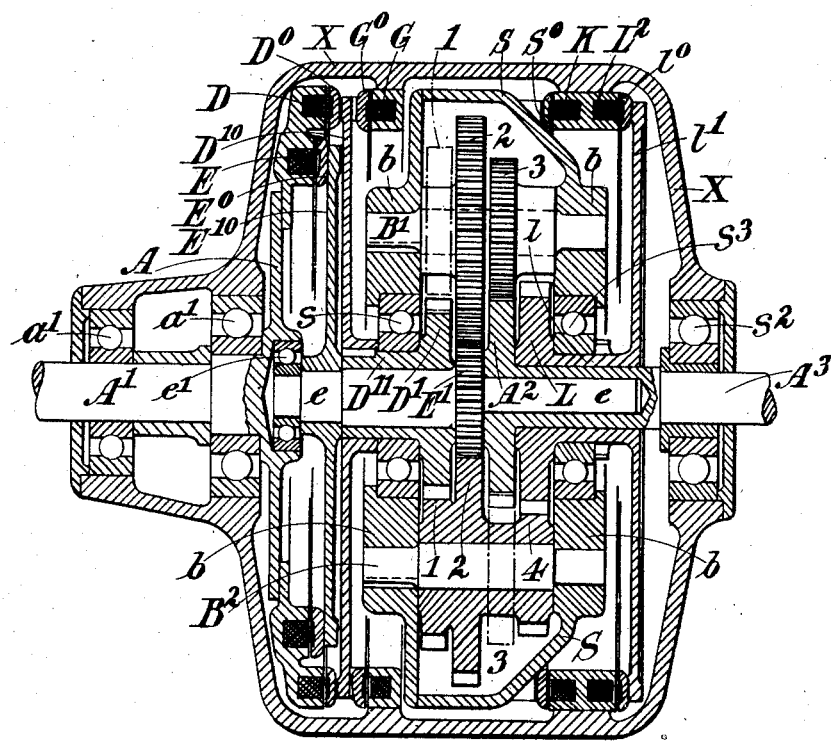
Inventor
Edward Reeve,
By Foster, Freeman, Watson & Coit,
Attorneys.

UNITED STATES PATENT OFFICE.

EDWARD REEVE, OF BIRMINGHAM, ENGLAND, ASSIGNOR TO THE MENCO-ELMA
SYNDICATE LIMITED, OF LONDON, ENGLAND.

CHANGE-SPEED GEARING.

1,365,195.      Specification of Letters Patent.      Patented Jan. 11, 1921.

Original application filed September 25, 1918, Serial No. 255,554. Divided and this application filed April 24, 1919. Serial No. 292,455.

*To all whom it may concern:*

Be it known that I, EDWARD REEVE, a subject of the King of England, residing in Birmingham, England, have invented certain new and useful Improvements in Change-Speed Gearing, of which the following is a specification.

This invention relates to change speed gearing of the spur epicyclic type in which the change of speed ratios is effected by the aid of electromagnetic clutches, the gear being more especially, but not exclusively, intended for use on motor vehicles.

One form of an electro-magnetic change-speed and reverse gear of the spur-wheel epicyclic type forming the subject-matter of Patent No. 1,316,740, this patent eventuating from my application, Serial No. 285,554 of which the present application is a division, is characterized by a construction such that three co-axial sun-wheels employed therein, two driving and one driven, are not only co-axial but are of three different sizes; that the driven sun-wheel is larger than the other two; and that the three planet-wheels which gear with them (*a*) are rigidly connected to one another and turn about a planetary axis parallel to the axis of the suns, and (*b*) have the smallest of the three planets geared to the largest of the three suns whereby a reverse is obtainable as well as three forward speeds in the manner hereinafter explained; and that two of the forward speeds are obtained by holding stationary the support of the planetary shaft.

An alternative construction of electro-magnetic change-speed and reverse gear of the spur-wheel epicyclic type forms the subject-matter of the present invention. It differs from that which is above referred to by the addition of an extra planet pinion fixed to the others, and of a brake-controlled fourth sun-wheel with which it gears, the said fourth sun-wheel being loose and turning on bearings that are co-axial with the driving shaft and being also combined with a stationary electro-magnetic brake appropriated to it, whereby it can be locked to and released from the stationary casing of the mechanism to enable additional speeds to be obtained, forward or reverse as desired. The related planetary pinions may be divided and placed on different parallel shafts as will hereinafter appear, provided that they are so geared together that they all turn at the angular velocities that they would possess were they all *en bloc* on one planetary shaft.

The accompanying drawing is a view in vertical central longitudinal section of a construction of gear according to the present invention and referred to above as having an extra planet pinion and a brake-controlled fourth sun-wheel with which it gears.

It is to be understood that in the drawing the electro-magnetic clutches and brakes are indicated diagrammatically only and that the details of their construction and of the mounting of their armatures are not of the present invention and may be of any convenient type.

With reference to the drawing a driving shaft $A^1$ which may conveniently be operated by a petrol motor, turns in ball-bearings $a^1$ in the fixed stationary casing X of the mechanism. Two driving sun-wheels $D^1$ $E^1$ of different diameters, are free to turn independently of the driving shaft $A^1$ with which they are co-axial. The smaller wheel $E^1$ of these two is fixed on a spindle $e$ which is supported at the left-hand end by ball-bearings $e^1$ supported in a cavity in a disk A secured to the right-hand end of the driving shaft $A^1$. The right-hand end of the spindle $e$ is supported in the hollow left-hand end of the driven spindle $A^3$, and the said driven spindle $A^3$ turns in ball bearings $s^2$ in the casing X. The larger, $D^1$, of the two sun-wheels $D^1$ $E^1$ is provided with a sleeve $D^{11}$ which encircles and can turn in relation to the spindle $e$ by which it is supported. The driven spindle $A^3$ can be connected in any suitable manner to, say, the road-wheels of an automobile vehicle, or to any other device which the change-speed gear is to actuate. The circular electro-magnets D and E of two electro-magnetic clutches are fixed to and turn with the disk A formed on the driving shaft $A^1$; the armatures $D^0$ and $E^0$ of these clutches D and E turn respectively with the disk $E^{10}$ fixed to the sleeve $D^{11}$ of the sun-wheel $D^1$ and with the disk $E^{10}$ fixed to and turning with the spindle $e$. Current conveyed by any suitable means to the electro-magnets D and E, or either of them, enables the suns $D^1$ and $E^1$, or either of them, to be clutched to the disk A so as to turn with it and the driving shaft $A^1$.

A stationary circular electro-magnet G is fixed to the casing X and with an armature G⁰ carried on the disk D¹⁰ aforesaid, forms an electro-magnetic brake. This when energized, holds the disk D¹⁰ stationary and with it the larger D¹ of the two driving sun-wheels D¹ E¹.

A third sun-wheel A², hereinafter termed the driven sun-wheel, is fixed to the driven shaft A³. It is co-axial with but larger than the other two sun-wheels D¹ E¹ in order that it may coöperate with the smallest of three out of four planetary wheels hereinafter referred to for the purpose *inter alia* of effecting a reverse drive of the driven shaft A³, in the manner hereinafter described.

A stationary annular electro-magnet K is fixed to the stationary casing X; its armature S⁰ is fixed to the rotatable support S, hereinafter described. By energizing the electro-magnet K the support S can be locked to the stationary casing X when required. When it is thus locked, two of the forward speeds of the gear are obtained, as will be hereinafter explained.

The left-hand end of the support S is carried on ball-bearings $s$ supported on the outside of the sleeve D¹¹, but the right-hand end of the support is carried on ball-bearings $s^3$ which are borne on the outside of the sleeve of the fourth sun-wheel aforesaid, presently to be again referred to. This is a fourth sun-wheel L fixed to a sleeve $l$ with which it can turn in relation to the driven shaft A³ with which latter and with the driving shaft it is co-axial. To this sleeve $l$ is fixed the disk $l^1$ carrying an armature $l^0$ for a stationary annular electro-magnet L² fixed inside the casing X of the gear. By means of this electro-magnet L² and the armature $l^0$ a stationary electro-magnetic brake is constituted whereby the fourth sun-wheel L can be locked to and released from the stationary casing.

Planetary spindles B¹ and B² parallel to the driving and driven shafts A¹ and A³ are fixed in bearings $b$ in the aforesaid support S which as will be seen from the drawing turns about an axis that is co-axial with the driving shaft.

On the first planetary spindle B¹ in the support S are two planetary pinions 2, 3 co-axial with it and which rotate on it and are connected to one another. On the second planetary spindle B² are three planetary pinions 1, 2 and 4 co-axial with it and which rotate on it and are connected to one another. The planetary pinion 2 on the spindle B¹ is geared to the smallest sun-wheel E¹ and the planetary pinion 3 on the spindle B¹ is geared to the driven sun-wheel A². The planetary pinion 1 on the second planetary spindle B² is geared to the larger of the driving sun-wheels D¹, the second planetary pinion 2 on the shaft B² being geared to the smallest sun-wheel E¹, and the third planetary pinion 4 on the planetary spindle B² being geared to the brake-controlled fourth sun-wheel L aforesaid.

There might be as shown in chain-lines a planetary pinion 1 on the shaft B¹ of the same size as that on the shaft B² and there might be on the shaft B² a planetary pinion 3 of the same size as the pinion 3 on the shaft B¹. Also, a pinion 4 might be placed on the shaft B¹ as well as on the shaft B². By such modifications the two planetary shafts B¹ B² and the groups of pinions upon them would be identical.

The operation of the device illustrated in the drawing will now be described. To obtain the first forward speed the fourth sun-wheel is held stationary by the electro-magnet L². The clutch E is energized whereby the smaller driving sun-wheel E¹ is rotated. This rotates the planetary pinions 2 with which it gears and turns them and the pinion 4 about their own axes; but the pinion 4 being in gear with the stationary fourth sun-wheel L, imparts to the support S by rolling along L, a motion of translation in a sense opposite to that in which the driving shaft turns. But as the pinion 3 which partakes of the rotary and translational motion of the wheels 2, 3 and 4 is larger than the pinion 4, the said pinion 3 imparts to the driven sun-wheel A² a slow motion of rotation in the same sense as that of the driving shaft.

To obtain the second forward speed, the support S is held stationary by the brake K; the clutch E is energized and the sun-wheel E¹ is driven. The latter turns the planetary pinion 2, which, the support S being stationary, imparts rotation about their common stationary axis to the pinion 3 and this in turn drives the driven sun-wheel A² in the same sense of rotation as that of the driving shaft.

To obtain the third forward speed the brake K remains energized but the clutch D is energized instead of the clutch E. This leads to rotation of the sun-wheel D¹ which driving the pinion 1, causes the pinions 2 (and incidentally the wheel E¹) and 3 to turn, the latter rotating the driven sun-wheel A² and shaft A³.

A fourth forward speed (a direct or "through" drive) is obtainable by clutching both the sun-wheels D¹ and E¹ to the driving shaft by means of the clutches D and E; this by reason of the difference in diameters of the sun-wheels D¹ and E¹, carries the planetary pinions and the support S around bodily so that the pinion 3 in this bodily motion of translation, turns the driven sun-wheel A² in the same sense and with the same angular velocity as that of the driving-shaft A¹.

An additional forward speed can be obtained while the sun-wheel L is locked, by driving the sun-wheel $D^1$ which will rotate the pinion 4 more rapidly than when that rotation was brought about by the sun-wheel $E^1$. This additional speed with the relative sizes of pinions 1, 2, 3 and 4 varying in the order illustrated in the drawing, would be intermediate between the first and second forward speeds above referred to.

To obtain a reverse in the gear illustrated the wheel $D^1$ is held stationary by energizing the electro-magnet G and the wheel $E^1$ is rotated by energizing the clutch electro-magnet E. It results under these circumstances that the planetary spindle $B^1$ is given by the rolling of planetary pinion 1 over the sun-wheel $D^1$ as over a circular track, a motion of translation around the driving-shaft $A^1$ in a sense opposite to that in which the driving-shaft is turning, and the planetary pinion 3 partakes of that moton of translation. If the planetary pinion 3 were of the same size as the planetary pinion 1 it would leave the driven sun-wheel $A^2$ stationary, but as it is smaller than the planetary pinion 1 it takes the sun-wheel $A^2$ with it in a direction the reverse of that in which the driving-shaft is turning.

In the construction illustrated the pinion 4 running around upon the sun-wheel L when the latter is stationary, gives the sun wheel $A^2$ two velocities, according as the driving force is supplied from the sun-wheel $D^1$ or from the sun-wheel $E^1$. The sense of these two velocities imparted to $A^2$ is that of the sense of rotation of the driving-shaft; this is because the pinion 3 is larger than the pinion 4. But if the pinion 3 were made smaller than the pinion 4 then the two velocities imparted to $A^2$, other things being equal, would be reverse velocities, that is to say $A^2$ would be rotated with a sense of rotation the reverse of that of the driving shaft.

Though only two planetary shafts ($B^1 B^2$) are shown in the vertical plane of the drawing it is to be understood that there may be several of these shafts and the pinions on the said shafts being set parallel with one another at suitable equal angular intervals apart around the main axis of the mechanism, as is common in epicyclic gears.

In the construction shown in the drawing the gear-wheels are all inclosed in the support S which is a hollow casing; this can easily be made oil-tight so that the gear may be run in a lubricant of a kind different from that employed for the clutches, so that the best lubricant can be selected for the different conditions of working in the gear and in the clutches.

What I claim as my invention and desire to secure by Letters Patent is:—

In an electro-magnetic change-speed and reverse gear of the spur-wheel epicyclic type, the combination of a driving-shaft, a stationary support therefor, two driving sun-wheels of different diameters loose and turning on bearings that are coaxial with the driving shaft, two rotatable electro-magnetic clutches whereby they may be clutched to and released from the driving shaft selectively and collectively, and a stationary electro-magnetic brake whereby the larger of the two driving sun-wheels can be locked to and released from the said stationary support of the driving-shaft, a driven sun-wheel, $A^2$, coaxial with but larger than the two driving sun-wheels, a brake-controlled sun-wheel L loose and turning on bearings that are coaxial with the driving shaft, a stationary electro-magnetic brake on the aforesaid stationary support, whereby the sun-wheel L can be locked to and released from the said stationary support, a planetary spindle $B^2$ parallel to the driving shaft, a rotatable support which turns about an axis that is coaxial with the driving-shaft, bearings on the rotatable support for the said planetary spindle, planetary pinions on and coaxial with the said planetary spindle which pinions are fixed to one another and are in gear with the corresponding sun-wheels, and another stationary electro-magnetic brake whereby the rotatable support can be locked to the aforesaid stationary support for the obtainment of two of the forward speeds as hereinbefore described.

In testimony whereof I affix my signature.

EDWARD REEVE.